United States Patent [19]

Goto et al.

[11] Patent Number: 5,117,712
[45] Date of Patent: Jun. 2, 1992

[54] SHIFT CONTROL DEVICE FOR AN AUTOMATIC TRANSMISSION

[75] Inventors: Shigeki Goto, Kariya; Masato Shimei, Midori, both of Japan

[73] Assignee: Aisin Seiki Kabushiki Kaisha, Kariya, Japan

[21] Appl. No.: 611,766

[22] Filed: Nov. 13, 1990

[30] Foreign Application Priority Data

Nov. 15, 1989 [JP] Japan ................................. 1-294886

[51] Int. Cl.⁵ ...................... B60K 41/06; B60K 20/02
[52] U.S. Cl. .......................................... 74/878; 74/866; 74/869; 364/424.1
[58] Field of Search .................. 74/866, 869, 878; 364/424.1

[56] References Cited

U.S. PATENT DOCUMENTS

| | | | |
|---|---|---|---|
| 4,468,987 | 9/1984 | Miller | 74/869 X |
| 4,476,747 | 10/1984 | Kawamoto | 74/869 |
| 4,838,126 | 6/1989 | Wilfinger et al. | 74/869 |
| 4,901,603 | 2/1990 | Ishikawa | 74/869 X |
| 4,995,285 | 2/1991 | Hayakawa et al. | 74/869 |
| 5,020,393 | 6/1991 | Kuwayama et al. | 74/869 |

Primary Examiner—Leslie A. Braun
Assistant Examiner—David E. Henn
Attorney, Agent, or Firm—Burns, Doane, Swecker & Mathis

[57] ABSTRACT

A shift control device for an automatic transmission comprises a shift valve, a solenoid valve connected to the shift valve, a shift timing valve also connected to the shift valve, a cut-off device connected to the solenoid valve and the shift timing valve, and a timing solenoid valve connected to the cut-off device so as to avoid the problem of shift shock which occurs when the timing solenoid valve is in an abnormal operating condition.

2 Claims, 4 Drawing Sheets

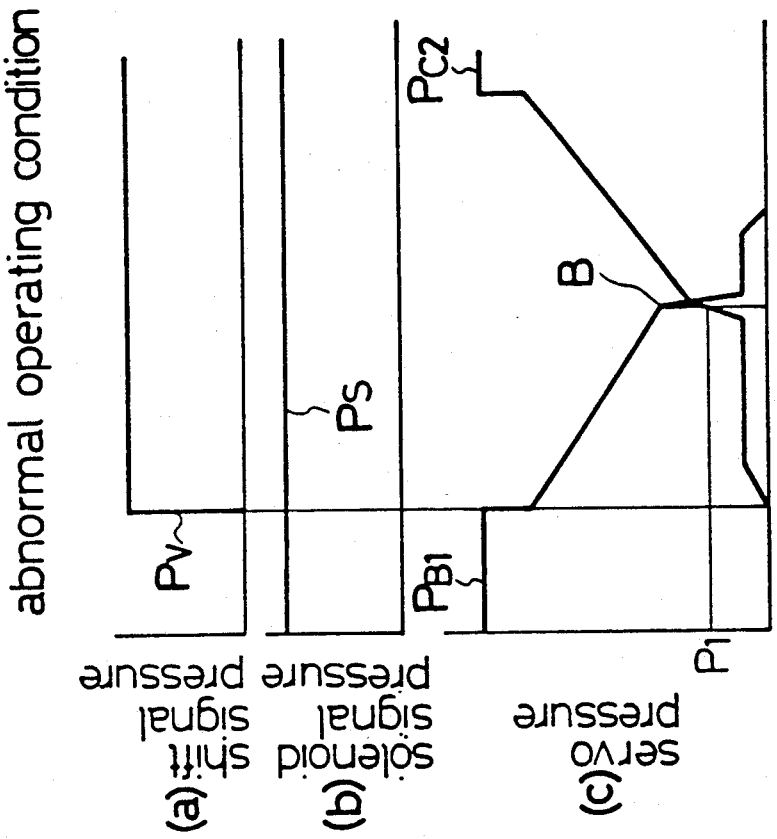
Fig. 4 abnormal operating condition
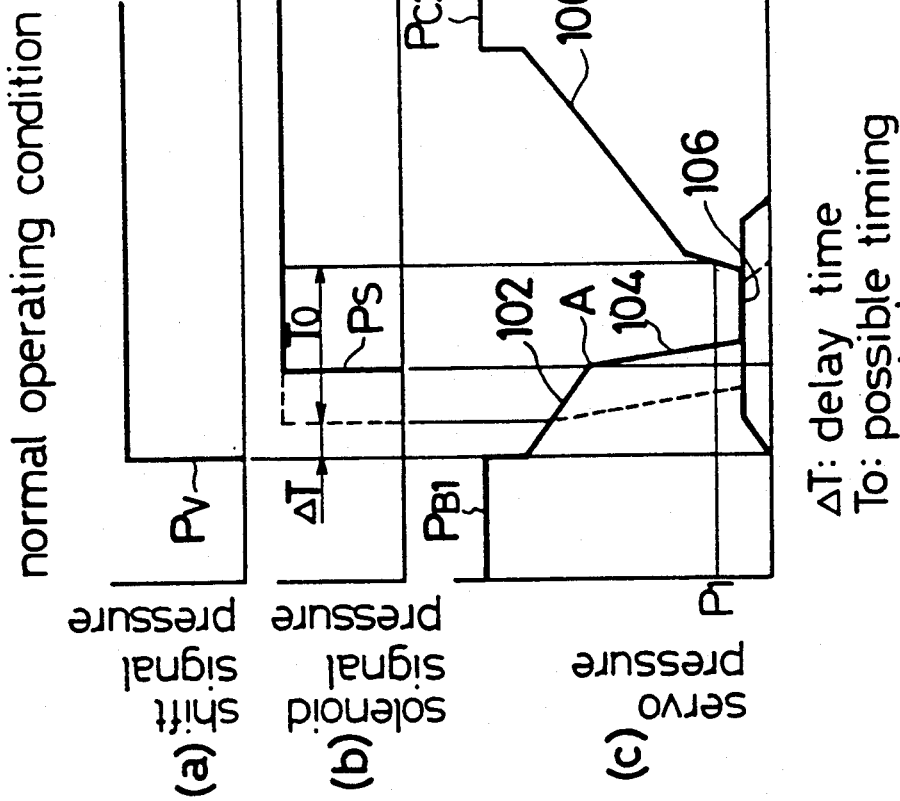
Fig. 3 normal operating condition
ΔT: delay time
To: possible timing control range

SHIFT CONTROL DEVICE FOR AN AUTOMATIC TRANSMISSION

BACKGROUND OF THE INVENTION

1. Field of the Invention

This invention relates to a shift control device for an automatic transmission for use in an automotive vehicle or other vehicle.

2. Description of the Related Art

In a shift control device for an automatic transmission, each shift change is accomplished by engagement and/or disengagement of a combination of multiple friction engaging elements (clutches, brakes).

Whereas, in the relationship between two friction engaging elements, one operated on the engaging side and the other operated on the releasing or disengagement side, the shift change between these elements must change over timely between the supply of hydraulic pressure and the exhaust of hydraulic pressure so as to reduce the shift shock. Therefore, an oil pressure control circuit for the shift control device is provided with an accumulator and a shift timing valve which opens a drain port on the releasing side in response to an increase of the hydraulic pressure of the engaging side.

A Control is also proposed for the sake of further reducing shift shock. That is to say, a timing solenoid valve is connected to the shift timing valve and controlled by an engine operating condition. The timing solenoid valve controls the exhaust of the hydraulic pressure from the drain port of the shift timing valve.

FIG. 5 shows an oil pressure control circuit of the foregoing underlap control type.

A 2-3 shift valve 10 is provided with a plural ports 12, 14, 16, 18, 20 and a spring member 22. The ports 12 and 14 as a first port supply a line pressure PL into a C2 clutch as a first friction engaging element via oil lines 30 and 32. The ports 16 and 18 as a second port supply a hydraulic pressure to a B1 brake as a second friction engaging element into a shift timing valve 40 via oil lines 34 and 36. The port 20 is located at one end of the 2-3 shift valve 10 and is connected with a solenoid valve 60 via an oil line 38. The spring member 24 is disposed in a chamber 24 which is located at the other end of the 2-3 shift valve 10 and urges a spool 26 in the upward direction as shown in the drawing.

The shift timing valve 40 is provided with timing port 42, 44, 46, 48, 50 and a first spring member 52. The first timing port 42 is in communication with the port 14 of the 2-3 shift valve 10 via the line 32. The second timing port 44 is in communication with the port 18 of the 2-3 shift valve 10 via the line 36. The third port 46 is connected to the drain side (not shown) via an orifice. The fourth port 48 is also connected to the drain side (not shown). The fifth port 50 is located at one end of the shift timing valve 40 and is connected with a timing solenoid valve 62 via a line 58. The first spring member 52 is disposed in a chamber 54 which is located at the other end of the shift timing valve 40 and urges a spool 56 in the downward direction as shown in the drawing. The timing solenoid valve is controlled by an electric control device (not shown). Accumulators 64, 66 are provided on lines 32, 34.

When the solenoid valve 60 which is of the normal open type is operated by a shift signal (not shown) which is outputted from the electric control device (not shown), a shift signal pressure Pv is supplied to the port 20 of the 2-3 shift valve 10 and acts to bias the spool 26 in the downward direction, as shown in the drawing, against a spring force of the spring member 22. Thereby, the line pressure PL is supplied to the C2 clutch with the result that the ports 12 and 14 communicate with each other. Also, the spool 56 of the shift timing valve 40 is moved in the upward direction, as shown in the drawing, with the result that a direct clutch pressure PC2 is supplied to the first timing port 42 via the line 32. Therefore, the engaging hydraulic pressure of the B1 brake is released with the result that the ports 16 and 18 communicate with each other. Correspondingly, a second brake pressure PB1 is supplied to the second timing port 44 via the line 36, and further the engaging hydraulic pressure of the B1 brake is drained from the third timing port 46 with the result that the second timing port 44 and the third timing port 46 communicate with each other. Accordingly, the 2-3 shift change is accomplished smoothly, without shift shock, by the shift timing valve 40.

The direct clutch pressure PC2 is increased corresponding to a characteristic of the accumulator 64, as shown by line 100 in FIG. 3-c, and is supplied to the direct clutch pressure PC2 and the first timing port 42 of the shift timing valve 40. As far as the C2 hydraulic pressure (the servo pressure) which is supplied to the first timing port 42 is less than a predetermined pressure P1, the fourth timing port 48 is maintained in a closed position. Thereby, the B1 hydraulic pressure which is supplied to the second timing port 44 is drained from only the third timing port 46 as shown by line 102 in FIG. 3-c.

When the timing solenoid valve, which is normally open, is operated by the engine condition (i.e. engine output), a solenoid signal pressure PS is supplied to the fifth timing port 50 of the 2-3 shift timing valve 40 as shown by point A in FIG. 3-c. The fourth timing port 48 is therefore opened. Correspondingly, the foregoing B1 hydraulic pressure is released from the fourth timing port 48 and is decreased as shown by line 104 in FIG. 3-c. As a result, the C2 clutch is not engaged when the B1 second brake is released. Namely there is an underlap condition as shown by line 106 in FIG. 3-c. Thereafter the C2 hydraulic pressure is increased. The 2-3 shift change is accomplished due to the C2 clutch being engaged.

However, in the above-mentioned Related Art, when the timing solenoid valve 62 has a valve-stick condition, as shown in FIG. 4-b, the solenoid signal pressure PS of the timing solenoid valve 62 is continuously supplied to the first timing port 42 of the shift timing valve 40. Thereby, the B1 hydraulic pressure is released from the third and fourth ports 46, 48 together when the 2-3 shift change is performed. Accordingly, the shift shock is increased because the engine output is abruptly increased (i.e. the engine output is large.). Also, the friction engaging elements are damaged due to premature wear by the result.

SUMMARY OF THE PRESENT INVENTION

It is an object of the invention to provide an improved shift control device for an automatic transmission which obviates the above-described drawbacks.

In order to accomplish the object, a shift control device for an automatic transmission comprises a shift valve, a solenoid valve onnected to the shift valve, a shift timing valve also connected to the shift valve, a cut-off means connected to the solenoid valve and the shift timing valve, and a timing solenoid valve connected to the cut-off means.

BRIEF DESCRIPTION OF THE DRAWINGS

FIG. 3 shows a timing diagram of a shift signal pressure, a solenoid pressure and a servo pressure under normal operating conditions of the invention, FIG. 4 shows a timing diagram of a shift signal pressure, a solenoid pressure and a servo pressure under abnormal operating conditions of the invention.

DETAILED DESCRIPTION OF PREFERRED EMBODIMENTS OF THE INVENTION

In a gear train of an automatic transmission of the type shown in FIG. 1 according to the invention, shifting of the transmission is effected by shift control of a solenoid valve, and the operations of multiple element friction engaging devices in each gear ratio are shown in the following Table 1.

TABLE 1

|   |     | C0 | C1 | C2 | B0 | B1 | B2 | SOL1 | SOL2 |
|---|-----|----|----|----|----|----|----|------|------|
| P |     | ○  | X  | X  | X  | X  | X  | ○    | ○    |
| R |     | ○  | X  | ○  | X  | X  | ○  | ○    | X    |
| N |     | ○  | X  | X  | X  | X  | X  | ○    | ○    |
| D | O/D | X  | ○  | ○  | ○  | X  | X  | X    | X    |
|   | 3   | ○  | ○  | ○  | X  | X  | X  | ○    | X    |
|   | 2   | X  | ○  | X  | X  | ○  | X  | ○    | ○    |
|   | 1   | ○  | ○  | X  | X  | X  | X  | X    | ○    |
| 2 | 2   | ○  | ○  | X  | X  | ○  | X  | ○    | ○    |
|   | 1   | ○  | ○  | X  | X  | X  | X  | X    | ○    |
| L |     | ○  | ○  | X  | X  | X  | ○  | X    | ○    | where

Figure 1:
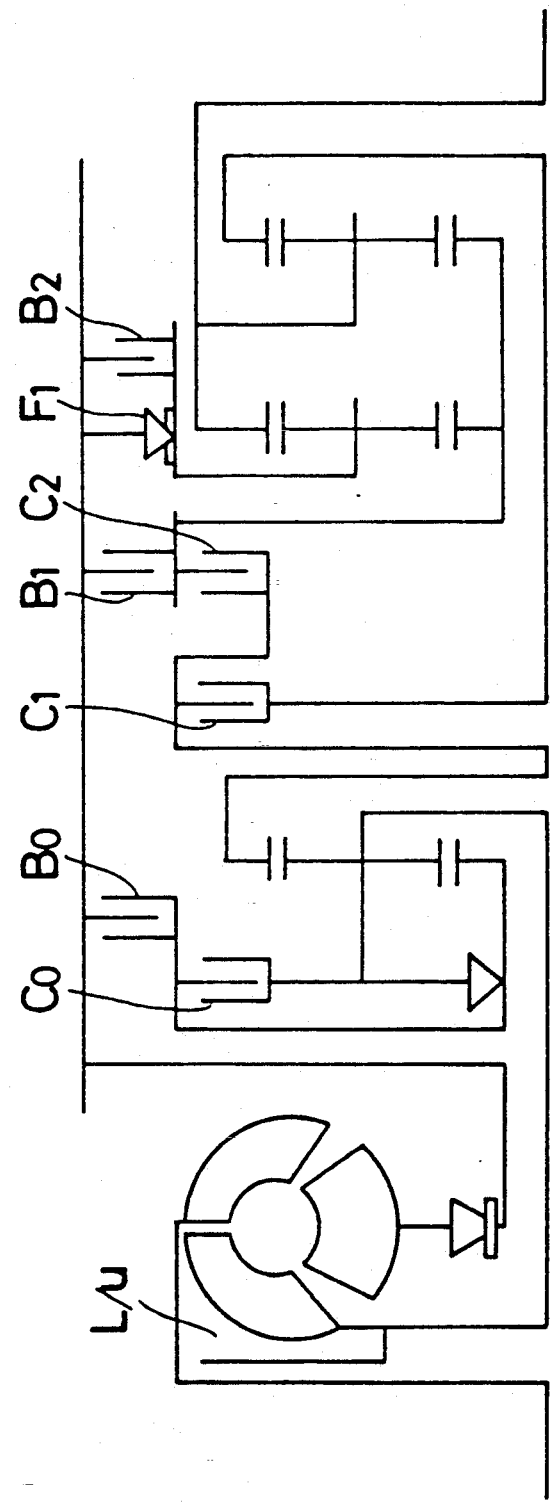
FIG. 1 is a schematic representation of a gear train of an automatic transmission of the invention.
Figure 2:
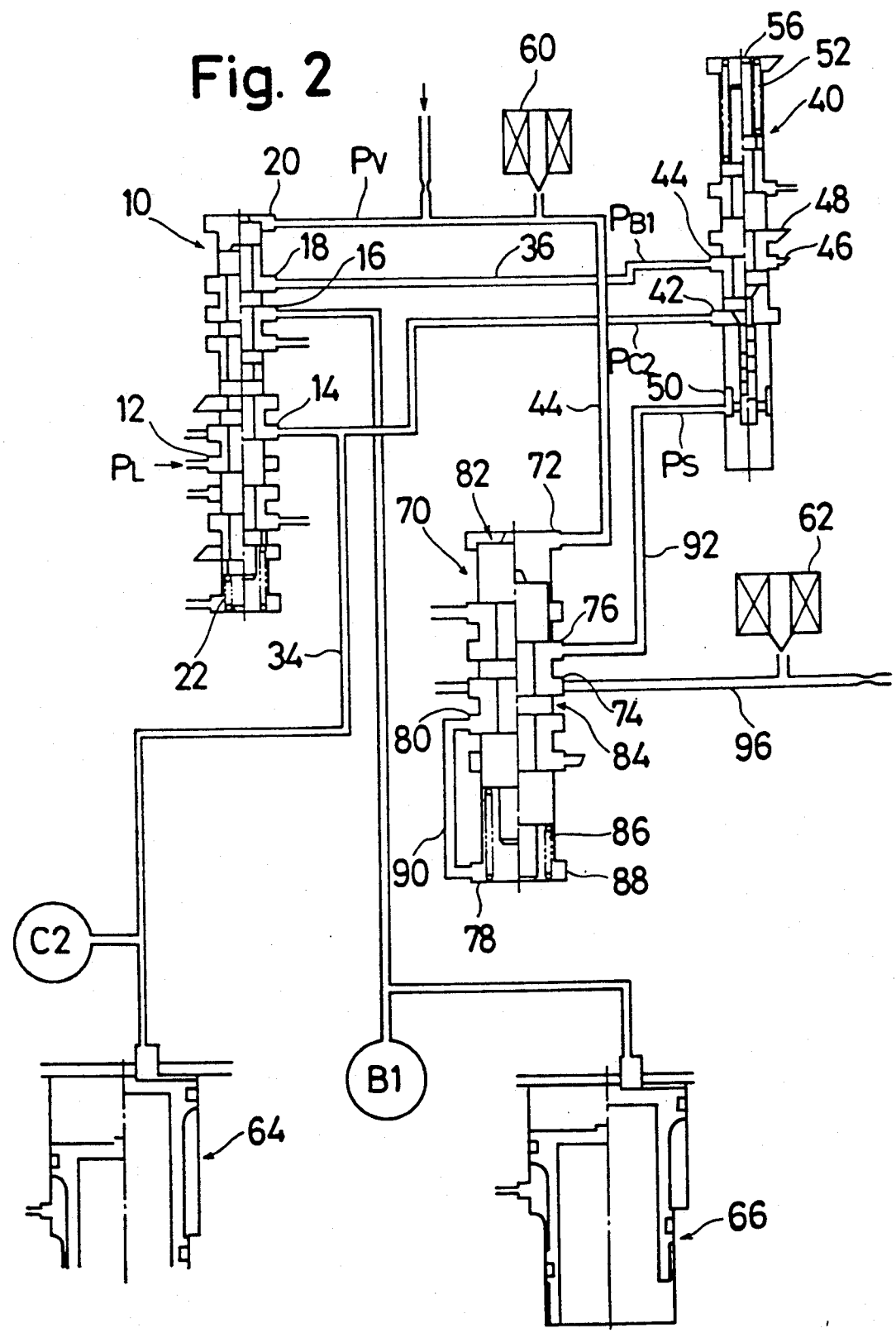
FIG. 2 shows an embodiment of an oil pressure control circuit of the invention.
Figure 5:
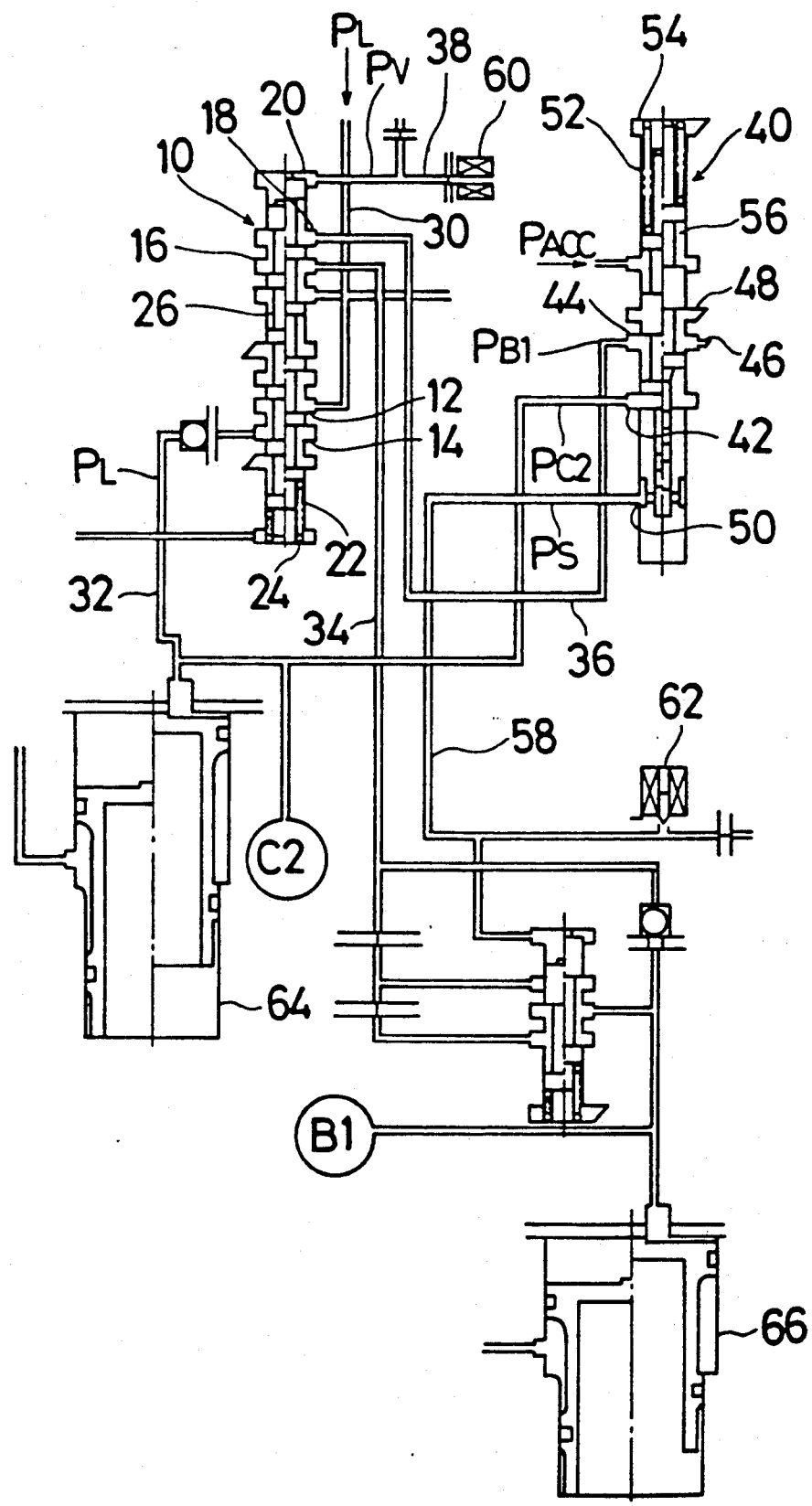
FIG. 5 shows an oil pressure control circuit of the Prior Art.

SOL1: normally closed type solenoid valve
SOL2: normally opened type solenoid valve FIG. 2 shows a part of an oil control circuit communicating with the gear train in FIG. 1. The invention is an improved shift control device for an automatic transmission of the above-conventional device. In this invention, a cut-off valve 70 is arranged between the 2-3 shift timing valve 40 and the timing solenoid valve 62.

The cut-off valve 70 includes a first connecting port 74 which is connected to the timing solenoid valve 62 via an oil line 96, a supply port 76 which is connected to the 2-3 shift timing valve 40 via an oil line 92, a second connecting port 72 which is connected to the solenoid valve 60 via an oil line 94, a land 84 which changes over communication between the first connecting port 74 and the supply port 76, a spring member 86 which is disposed in a chamber 88, a first communicating port 78 which is opened to the chamber 88 and is continuously in communication with a second communicating port 80 via an oil line 90, and a valve spool 82 which is slidably moved by acting between a spring force of the spring member 86 and the shift signal PV of the solenoid valve 60.

The operation of the above construction of the invention is described below.

In a case where the timing solenoid valve 62 is in a normal condition, the valve spool 82 is moved upwardly by the spring member 86. When the shift signal PV is outputted as shown in FIG. 3-a, the shift signal PV is supplied to the port 20 of the 2-3 shift valve 10 and the second connecting port 72 of the cut-off valve 70. Therefore, the valve spool 82 is moved in the downward direction as shown in the drawing against the spring force of the spring member 86, and the first connecting port 74 and the supply port 76 come into communication with each other. Thus, the underlap control can be performed because the solenoid signal pressure PS is supplied into the fifth timing port 50 of the 2-3 shift timing valve 40. The electric control device (not shown) is provided with a predetermined delay time ΔT, as shown in FIG. 3-b, so that the solenoid signal pressure PS can be outputted after the change of the cut-off valve 70, and the solenoid signal pressure PS is supplied into the fifth timing port 50 of the shift timing valve 40 via the oil line 92. Thereby, the underlap control is performed so that the fourth timing port 48 will be opened by moving the spool 56 of the 2-3 shift timing valve 40 against the first spring member 52 as shown in the upward direction of the drawing.

When the timing solenoid valve 62 is in a condition in which the valve sticks, the solenoid signal pressure PS is continuously outputted as shown in FIG. 4-b. However, the solenoid signal pressure PS is supplied to the chamber 88 through the first and the second communication ports 80 and 78. Therefore, the valve spool 82 is further moved upwardly by the solenoid signal pressure PS. Thereby, the communication between the first connecting port 74 and the supply port 76 is prevented by the land 84. Thus, the solenoid signal pressure PS is prevented from being suppling to the fifth port 50 of the 2-3 shift timing valve 40. The B1 hydraulic pressure is prevented from releasing aburuptly from the third and the fourth timing port 46 and 48. Accordingly, this invention provides an improved shift control device for an automatic transmission which avoid the problem of shift shock which occurs when the timing solenoid valve 62 is in an abnormal operating condition. In this case, the 2-3 shift timing valve 40 becomes the timing control which is controlled by only the direct clutch pressure PC2 as shown in FIG. 4-c.

What is claimed is:

1. A shift control device for an automatic transmission, comprising:
   a shift valve,
   a shift timing valve hydraulically connected to said shift valve,
   a solenoid valve hydraulically connected to said shift valve so as to supply hydraulic pressure from said shift valve to a first engaging element and to release hydraulic pressure from a second engaging element to a first drain port of said shift timing valve through said shift valve when a shift signal is supplied thereto,
   a timing solenoid valve hydraulically connected to said shift timing valve so as to release hydraulic pressure from said second engaging element to a second drain port of said shift timing valve in addition to said first drain port when said timing solenoid valve is energized, and
   a cut-off means hydraulically connected to said solenoid valve and provided between said shift timing valve and said timing solenoid valve for cutting off hydraulic communication between said shift timing valve and said timing solenoid valve when said timing solenoid valve is energized before said shift signal is supplied to said solenoid valve.

2. A shift control device for an automatic transmission according to claim 1, wherein said cut-off means includes a first connecting port hydraulically connected to said timing solenoid valve, a supply port hydraulically connected to said shift timing valve, a second connecting port hydraulically connected to said solenoid valve so as to communicate said first connecting port with said supply port when said shift signal is supplied to said solenoid valve, a supporting port in communication with a chamber and communicating with said first connecting port and cutting off hydraulic communication between said first connecting port and said supply port by a land when said timing solenoid valve is energized before said shift signal is supplied to said solenoid valve.

* * * * *